United States Patent [19]

Behnke et al.

[11] Patent Number: 4,686,044
[45] Date of Patent: Aug. 11, 1987

[54] POLYCARBONATE-POLYETHER-COPOLYMER MEMBRANE

[75] Inventors: Joachim Behnke, Amorbach; Hans-Jürgen Pitowski, Miltenberg, both of Fed. Rep. of Germany

[73] Assignee: AKZO NV, Arnhem, Netherlands

[21] Appl. No.: 807,766

[22] Filed: Dec. 9, 1985

Related U.S. Application Data

[63] Continuation of Ser. No. 573,552, Jan. 25, 1984, abandoned, which is a continuation of Ser. No. 399,983, Jul. 19, 1982, abandoned, which is a continuation of Ser. No. 177,462, Jul. 11, 1980, abandoned.

[30] Foreign Application Priority Data

Aug. 13, 1979 [DE] Fed. Rep. of Germany ....... 2932761

[51] Int. Cl.$^4$ .................... B01D 39/00; D02G 3/00
[52] U.S. Cl. .................. 210/500.22; 210/500.4; 210/500.23; 428/398
[58] Field of Search ............... 428/398, 376, 978; 210/500.2, 500.1, 500.21, 500.22, 500.23, 500.27; 264/41, 45.9, 176 F, 178 F, 181, 209.1

[56] References Cited

U.S. PATENT DOCUMENTS 3,448,185 6/1969 Sims ........................... 264/178 F
4,032,309 6/1977 Salemme ....................... 264/41

Primary Examiner—Lorraine T. Kendell
Attorney, Agent, or Firm—Michael J. Striker

[57] ABSTRACT

A method is provided for producing a membrane from polycarbonate-polyether-blockcopolymers with about 5 to 35 weight percent of repeating alkyleneethercarbonate units and about 95 to 65 weight percent of repeating bisphenol A-carbonate units, wherein the polyethyleneoxide blocks have a molecular weight from about 1,000 to 20,000, wherein the intrinsic viscosity of the copolymer is from about 180 to 300 ml/g as measured in chloroform at 25° C. and wherein the ultrafiltration rate is from about 4 to 200 ml/h.m$^2$.mm Hg. In a first dissolving step a polycarbonate-polyether-copolymer is homogeneously mixed with a solvent at a temperature from about 80° to 120° C. and in a second dissolving step the temperature is brought to about 140° to 180° C. to produce a true solution. The filtered solution is cooled to from about 20° to 50° C. and is then extruded through a nozzle into a bath comprising a nonsolvent for the polymer for precipitating the polymer. The precipitated polymer is then washed and dried. The resulting membranes improve the processes of hemodialyzing and of homofiltration.

12 Claims, No Drawings

POLYCARBONATE-POLYETHER-COPOLYMER MEMBRANE

This is a continuation of application Ser. No. 573,552, filed Jan. 25, 1984, and now abandoned; which is a continuation of application Ser. No. 399,983, filed July 19, 1982, and now abandoned; which is a continuation of application Ser. No. 177,462, filed July 11, 1980, and now abandoned.

BACKGROUND OF THE INVENTION

1. Field of the Invention

The present invention relates to a membrane from a polycarbonate-polyether-blockcopolymer with 5 to 35 weight percent alkyleneether-carbonate units and with 95 to 65 weight percent of repeating bisphenol A-carbonate units.

2. Brief Description of the Background of the Invention Including Prior Art

Membranes from a polycarbonate-polyether-blockcopolymer with 5 to 35 weight percent repeating alkylenether-carbonate units and with 95 to 65 weight percent of repeating bisphenol A-carbonate units have been disclosed. The German Offenlegungsschrift DE-OS No. 27 13 283 discloses such a polyether-polycarbonate-blockcopolymer membrane having properties substantially directed toward a relatively high dialytical permeability for vitamine B 12 at a low ultrafiltration rate. The intrinsic viscosities following from the indicated molecular weights are under 170 ml/g and for ultrafiltration values should be maintained which are below of 4 ml/h.m².mm Hg. The mechanical properties of such membrane are only little satisfactory.

Most recently, memofiltration has been introduced as a treatment method for dialysis patients suffering from high blood pressure. In order to reinfuse larger amounts of liquid into the human blood circulation membranes are required for the dialysis treatment, which have a high hydraulic permeability.

Conventionally, the membranes of polycarbonate-polyether-copolymer were prepared (compare for example U.S. Pat. No. 4,048,271 and German Offenlegungsschrift DE-OS No. 27 11 498) by scraping on of a thinned polymer solution containing a material for the formation of pores onto a surface followed by partial evaporation of the solvent. After the partial evaporation of the solvent the membranes were jellied in a water bath. After washing the membranes were stored in a plastic bag or another container containing water and a sterilizing agent such as for example formaldehyde.

SUMMARY OF THE INVENTION

1. Purposes of the Invention

It is an object of the present invention to provide a membrane from polycarbonate-polyether-copolymers having high ultrafiltration efficiencies and such mechanical properties that they can be stored and handled when in dry form.

It is another object of the invention to provide a technologically simplified process for direct production of such membranes.

It is a further object of the present invention to improve the processes of hemodialysis and hemofiltration.

These and other objects and advantages of the present invention will become evident from the description which follows.

2. Brief Description of the Invention

The present invention provides a membrane from a polycarbonate-polyether-blockcopolymer with about 5 to 35 weight percent of repeating ethylenepolyether carbonate units wherein the polyethyleneoxide blocks have a molecular weight of from about 1,000 to 20,000 and with 95 to 65 weight percent of repeating bisphenol A-carbonate units, wherein the intrinsic viscosity of the copolymer is from about 180 to 300 ml/g as measured in chloroform at 25° C. and wherein the ultrafiltration rate is from about 4 to 200 ml/h.m².mm Hg. The membrane can be formed as a flat foil, as a tubular foil or as a hollow fiber. Numerically, the dialytical permeability $DL_{B12}$ for vitamine B 12 ( as measured at 20° C. ) can depend on the ultrafiltration efficiency UFL according to the formula $$DL_{B12} = (\text{about } 2.25 \text{ to } 2.75) \cdot \sqrt{UFL}.$$

Preferably, the polycarbonate-polyether-copolymer comprises from about 7 to 13 weight percent of repeating polyethyleneoxide-carbonate units, wherein the average molecuar weight of the polyethyleneoxide blocks is from about 6,000 to 10,000, and of 93 to 87 weight percent of repeating bisphenol A-carbonate units. The contents of the membrane composition in auxiliary materials and in impurity materials can be less than about 0.5 weight percent. In the preferred polycarbonate-polyether-copolymer numerically the dialytic permeability $DL_{B12}$ for vitamine B 12 ( as measured at 20° C.) can depend on the ultrafiltration efficiency UFL according to the formula $$DL_{B12} = (\text{about } 1.1 \text{ to } 1.5) \cdot \sqrt{UFL}.$$

There is also provided a method for production of a membrane from polycarbonate-polyether-blockcopolymers with about 5 to 35 weight percent of repeating alkyleneether-carbonate units and about 95 to 65 weight percent of repeating bisphenol A-carbonate units, which comprises homogeneously mixing in a first dissolving step a polycarbonate-polyether-copolymer with a solvent at a temperature of from about 80 to 120° C., increasing the temperature to about from 140° to 180° C. in a second dissolving step for producing a true solution, filtering the solution, cooling the filtered solution to from about 20° C. to 50° C., extruding the solution through a nozzle into a bath comprising a nonsolvent for the polymer for precipitating the polymer, washing the polymer in wash and treatment baths for removing the solvent and drying the precipitated polymer in the presence of measures preventing shrinkage. Preferably, the solvent is γ-butyrolactone and the weight ratio of the polycarbonate-polyether-blockcopolymer to γ-butyrolactone solvent can be from about 10:90 to 20:80. Preferably the second dissolving step lasts less than about 10 minutes. The nozzle can be suitable for producing a tubular foil, a hollow fiber or a flat foil. The wet solvent-free washed flat foil can be dried on a band running through a drying oven for production of a flat foil membrane. Shrinkage can be prevented by attaching the foil on the sides of the band or by adhesion of the foil to the band. A preferred band is from a polyethyleneterephthalate foil. The polymer can be prevented from shrinking in longitudinal and cross direction. The solvent can be removed from the foil to the limit of detectability. A preferred temperature range of the first dissolving step is from about 100° to 110° C. and for the second dissolving step is from about 150° to 170° C. The nonslovent can be for example water, an alcohol having from 1 to 4 carbon atoms and the nonsolvent can comprise auxiliary materials.

There is further provided in the processes of hemodialysis or hemofiltration the improvement comprising employing a membrane from a polycarbonate-polyether-blockcopolymer with about 5 to 35 weight percent of repeating ethyleneether-carbonate units wherein the polyethyleneoxide blocks have a molecular weight of from about 1,000 to 20,000 and with 95 to 65 weight percent of repeating bisphenol A-carbonate units, wherein the intrinsic viscosity of the copolymer is from about 180 to 300 ml/g as measured in chloroform at 25° C. and wherein the ultrafiltration rate is from about 4 to 200 ml/h.m².mm Hg.

DESCRIPTION OF INVENTION AND PREFERRED EMBODIMENTS

In accordance with the present invention there is provided a membrane wherein the polyether blocks are polyethyleneoxide blocks with an average molecular weight of from 1,000 to 20,000, wherein the intrinsic viscosity of the copolymer is 180 to 300 ml/g as measured in chloroform at 25° C. and wherein the ultrafiltration rate is from about 4 to 200 ml/h.m².mm Hg.

The ultrafiltration rate of membranes is determined by the measurement of a liquid volume, which passes at a given pressure difference at a temperature of 20° C. through a membrane area fixed by the apparatus and which rate is normalized for general comparison with respect to area unit, time unit and pressure unit. Water is employed as a liquid. The method is described in "Evaluation of Hemodialyzers and Dialysis Membranes" of the U.S. Department of Health, Education and Welfare, DHEW Publication No(NIH) 77-1294, pages 24–26. It is preferred when numerically the dialytical permeability for vitamine B 12 as measured at 20° C. of the membrane of the present invention in each case depends on the ultra-filtration efficiency according to the formula $$DL_{B12} = (2.5 \pm 0.25) \cdot \sqrt{UFL} \ .$$

The ultrafiltration efficiency has the dimension of ml/min . kp. The ultrafiltration efficiency results from the ultrafiltration rate in ml/hm².mm Hg by dividing through the factor 815, that is for example to an ultrafiltration rate of 4 ml/h.m³.mm Hg corresponds an ultrafiltration efficiency UFL of $4.9 \cdot 10^{-3}$ ml/min kp. The formula giving the connection between ultrafiltration efficiency UFL and dialytic permeability for vitamine B 12 ($DL_{B12}$) holds only numerically and does not hold regarding the dimension. It has been determined by regression.

The dialytical permeability is in dialysis membranes a measure for the transmission of the membrane for dissolved materials and depends in addition to the membrane from the molecular weight of the dissolved material. As a test material for the uremia poisons in the range of an average molecular weight of 500 to 3000 is employed for determination of suitability of a membrane a solution of 100 mg/l of vitamine B 12 for measuring the average molecule transmission. The diffusive, pressureless concentration change of two different concentration starting solutions is measured on both sides of the membrane over the time. The average molecular transmission is calculated with the following equation when a vitamine B 12 solution is employed.

$$\text{transmission of molecules with a medium-range molecular weight} = \frac{\ln \Delta c_1/\Delta c_2}{A(1/Va + 1/Vb)(t_2 - t_1)}$$

wherein $\Delta c_i$ = measured concentration difference between both membrane sides at time $t_i$ A = membrane area Va+Vb = volume of both chambers separated by the membrane.

This method is also described in "Evaluation of Hemodialyzers and Dialysis Membranes" of the U.S. Department of Health, Education and Welfare, DEHW Publication No. (NIH) 77-1294, pages 14 and 15 for the measurement with flat and tubular membranes and on page 20 for the measurement of hollow fibers.

In a special embodiment of the present invention the polycarbonate-polyether-copolymer has 7 to 13 weight percent of repeating polyethyleneoxide-carbonate units and 93 to 87 weight percent of repeating bisphenol A-carbonate units and the average molecular weight of the polyethyleneoxide blocks is from about 6000 to 10,000. Under average molecular weight is understood here the weight average.

Such a menbrane can be advantageously dried without any after treatment, such as with for example glycerol, without that the structure of the membrane collapses. The membrane is characterized in that its contents in auxiliary and impurity materials is less than 0.5 weight percent.

In such membranes, advantageously the structure can be modified that they show an even higher ultrafiltration rate in relation to the vitamine B 12 permeability. Preferably, numerically the dialytic permeability for vitamine B 12 (measured at 20° C.) of such a membrane as it depends on the ultrafiltration efficiency follows the equation $$DL_{B12} = (1.3 \pm 0.2) \cdot \sqrt{UFL} \ .$$

The invention further provides for a method for production of a membrane as a flat foil, a tubular foil and a hollow fiber, which is characterized in that at a temperature from about 80° to 120° C. in a first dissolving step a polycarbonate-polyether-blockcopolymer is homogeneously mixed with γ-butyrolactone. In a second dissolving step at a temperature from about 140° C. to 180° C. this is transformed in less than about ten minutes into a true solution and after filtration it is cooled to a temperature of from about 20° to 50° C. This solution is then extruded through a nozzle into a bath comprising a nonsolvent for the polymer into a tubular foil, a flat foil or a hollow fiber and these are washed solvent-free down to the detection limit by employing wash and treatment baths. These are then dried under prevention of shrinkage in the longitudinal and cross dimensions.

The usual slot and ring nozzles are employed for flat foils and tubular foils such as they are known for example in the flat and tubular foil production according to the Cuoxam process. For hollow fibers the usual hollow fiber nozzles are employed such as for example disclosed in German Patent DE-PS No. 736 721. Butylstearate has proven useful as a hollow spaces forming liquid. Other inert liquids can be used in the same way. In general the nozzles are submerged in the bath containing the nonsolvent. It is also possible to let the polymer solution pass initially through an air distance in order for example to be able to work with larger nozzle dimensions. Whereas cast foils are frequently formed from thinned polymer solutions by partial evaporation of the solvent, in the process of the present invention relatively concentrated solutions are employed. Preferably in the first solution step polycarbonate-polyether-blockcopolymers and γ-butyrolactone are mixed in a weight ratio of from about 10:90 to 20:80.

By employing γ-butyrolactone as a solvent and by precipitating into a nonsolvent it is surprisingly possible to produce porous membranes which exhibit excellent mechanical properties at good dialysis and ultrafiltration efficiencies without initially requiring any auxiliary materials for providing such structure. The process conditions allow to adjust the structure within a wide range as desired.

A sufficiently rapid transfer of the γ-butyrolactone polycarbonate-polyether-copolymer mixture into a homogeneous gel-like mixture is achieved when preferably the temperature of the first dissolving step is from about 100° to 110° C.

The temperature in the second dissolving step should not exceed 180° C. since otherwise the danger of a thermal damage to the copolymer arises which would result in disadvantageous membrane properties. The intended transition from a gel-like solution as produced by the first dissolving step into a true solution in this dissolving step is assured with a relatively short dwell time, when the temperature in the second dissolving step is from about 150° to 170° C.

Nonsolvents in the context of the present invention are such liquids wherein the copolymer is insoluble and which are miscible with the solvent of the copolymer in any ratio. The preferred solvent is γ-butyrolactone.

Nonsolvents include for example low boiling ketones and lactic acid ethyl ester. A preferred nonsolvent is water, which is eminently suitable. Other preferred nonsolvents include alcohols amongst which ethylalcohol is preferred, since in this case no toxicity has to be feared which could result from alcohol residues left whereas this danger cannot be excluded with methylalcohol. The nonsolvents can comprise additives such as for example salts and other electrolytes, glycerol, γ-butyrolactone and the like.

Wash and treatment baths are liquids containing as a substantial ingredient a nonsolvent. In general the membrane is treated in a last treatment bath with an aqueous or alcholic glycerol solution. Advantageously, the glycerol solution can be sprayed on or printed on.

In the drying process of the membrane it is essential that shrinking is prevented in longitudinal and cross direction of the membrane. This means that in the drying of tubular foils or of flat foils the area of the surface does not change, but only the thickness of the membrane changes. In the drying of hollow fibers the length and the inner diameter do not change, since this is prevented by the hollow space forming liquid and the fiber tension when running through the drying oven.

Flat foils are preferably dried on a band running inside the drying oven.

Shrinkage prevention can be achieved by attaching the foil to the sides of the band such as by clamping devices. A particularly advantageous way of preventing shrinking results when the shrinking prevention is provided by the adhesion of the membrane foil on the band. The membrane is held by the adhesion so solidly against the total area of the band that it cannot shrink in longitudinal or cross direction. After drying it can be simply lifted off from the band. Decisive for the effectiveness is the material from which the band was produced and the surface properties of the band. A band from a polyethyleneterephthalate foil proved to be suitable.

In the following the invention is further illustrated by way of examples.

EXAMPLES 15.55 kg γ-butyrolactone were placed into a heatable 40 l vessel with stirring arrangement at room temperature and 2.325 kg of a polycarbonate-polyether copolymer were added under rapid stirring, which copolymer comprised bisphenol A and polyethylene glycol of an average molecular weight of 10,000 in a weight ratio of 90% to 10%, calculated as carbonate units, and which exhibits an intrinsic viscosity of 200, such that the concentration is 13 weight percent. It was heated to 100° C. to 110° C. and a still gel-like solution resulted. The solution is vented by evacuation and is fed to a dynamic mixer for homogenization by way of two geared pumps from which one operates as a pressure and one as a measuring pump, respectively. Then the solution is heated in a heatable tube conduit with double wall to about 160° C. and a clear gel-free solution results. For improved heat transfer statical mixing aids are installed in the tube conduit. The dwell time in this heated zone was 7 minutes. The heated solution then passed to a filter unit and was filtered there over layers of fabric. Then in a cooling zone the solution was cooled to 50° C. and in-line fine-filtered through 2 μm metal fabric filters. The clear, vented and filtered casting solution having a kinematic viscosity of 92.5 Pa.s at 20° C. then flowed to a slot nozzle of 50 cm slot width, the gap of which was adjusted to 120 μm.

By precipitating into water of room temperature a membrane of about 40 μm wet thickness was formed. The membrane did not exhibit any significant structure differences over the thickness in the structure even with a magnification of 80,000:1 in a transmission electron microscope and which therefor could be designated as isotropic. This did further indicate that the membranes formed in this way are in their dialytical and ultrafiltrating properties not determined by a kind of skin on their surface but through the bulk precipitated structure. In a washing section the thus obtained membranes were washed from γ-butyrolactone until below the detection sensitivity of the gas chromatograph and then transformed into the dry state.

In general, the drying is performed in the following way:

The membranes still wet from the production are passed through a bath of 25° C., which contains for example 35 weight percent glycerol, 10 weight percent water an 55 weight percent ethylalcohol. The dwelling time is about 1 minute. After leaving the bath the membrane is passed through a pair of rollers to assure a defined stripping of the membrane surface. Then the membrane is placed on the surface of a dense band circulating in a drying channel. The band has to be such that the membrane during the full drying process attached solidly to the support and can neither in longitudinal nor in cross direction shrink.

A drying process without this shrinkage prevention always results in a substantial decrease of the performance data of the membrane. After the drying the membrane has to be easily removable from the band support. A polyethylene-terephthalate foil available under the trademark Melinex ® was employed as a band material. Other foils such as metal foils with a defined roughness depth can also be employed here.

Depending on the polymer composition, the wet membrane can also be immediately dried without first passing through a bath of glycerine, water and ethylalcohol and in otherwise the same way. There is no need to fear that the removal of the water from the membrane material results in a collapse of the same and that the performance data of the membrane are strongly negatively influenced thereby.

immediate drying at 60° C. and 3 minute dwelling time in the reactor without preceding aftertreatment. Table III shows measurement results of membranes listed in Table I after drying with preceding aftertreatment. The dwell time in the drying oven was also 3 minutes in each case.

By way of measurement of dialytical permeability for inulin ($\overline{MG}$=5200) and cytochrome C ($\overline{MG}$=13500) it was determined that the exclusion limit of the membranes according to the present invention is at a molecular weight of about 10,000.

A detailed description relating to additional starting materials and their production for the membranes is provided in U.S. patent application Ser. No. 396,688 filed July 9, 1982 by Joachim Behnke and Christoph Josefiak for Polycarbonate-polyether-blockcopolymers, and now abandoned, which disclosure is hereby incorporated by reference.

TABLE I

| Run number | BPA-Carb.:PEG-Carb. weight ratio | $\overline{Mw}$ PEG molecular weight | Membrane thickness (wet) [m] | Intrinsic viscosity [ml/g] | Concentration polymer solution [weight %] | UFL · $10^3$ (wet) [ml/min · kp] |
|---|---|---|---|---|---|---|
| 1 | 90:10 | 3,000 | 23 | 200 | 16 | 24 |
| 2 | 80:20 | 3,000 | 11 | 198 | 13 | 30 |
| 3 | 80:20 | 6,000 | 21 | 205 | 16 | 21 |
| 4 | 85:15 | 6,000 | 30 | 180 | 19 | 23 |
| 5 | 85:15 | 6,000 | 33 | 205 | 13 | 25 |
| 6 | 90:10 | 6,000 | 17 | 183 | 16 | 65 |
| 7 | 92:8 | 6,000 | 38 | 183 | 13 | 25 |
| 8 | 80:20 | 10,000 | 23 | 211 | 16 | 28 |
| 9 | 85:15 | 10,000 | 31 | 202 | 13 | 42 |
| 10 | 90:10 | 10,000 | 47 | 181 | 13 | 127 |
| 11 | 92:8 | 10,000 | 35 | 183 | 13 | 48 |
| 12 | 80:20 | 20,000 | 23 | 206 | 16 | 50 |
| 13 | 90:10 | 20,000 | 41 | 190 | 13 | 135 |
| 14 | 90:10 | 10,000 | 35 | 197 | 13 | 95 |
| 15 | 85:15 | 10,000 | 39 | 208 | 13 | 45 |

BPA-Carb. = Bisphenol A-carbonate
PEG-Carb. = Polyethyleneglycolcarbonate
PEG = Polyethyleneglycol $\overline{Mw}$ = average molecular weight (weight average)

Decisive for the selection of the drying process is the composition of the polymer employed for the production of the membrane. The last described way of drying is possible with such membranes of polycarbonate-polyether-copolymers having from about 7 to 13 weight percent of repeating polyethyleneoxide-carbonate units and about 93 to 87 weight percent repeating bisphenol A-carbonate units wherein the polyethylene-oxide blocks have an average molecular weight of from about 6,000 to 10,000.

The dried membranes according to the present invention are then irradiated with γ-rays, for example from a Co-60 radiation source and sterilized. Surprisingly it was found that upon an irradiation with 2.5 Mrad the ultimate tensile strength in longitudinal direction had increased by about 50% from about 800 cN to more than 1200 cN and that the elongation of the membrane material increased from 100% to 430 to 500%, that is by a factor of four to five. The samples measured had a length of 100 mm with a gripping width of 15 mm with a stretching velocity of 500 mm/min and a nip device was employed.

The following tables summarize the results of measurements with several different membranes according to the present invention. Table I shows the dependence of the ultrafiltration efficiency UFL depending on the polymer composition and the various influencing values in the production of the membranes. Table II shows the

TABLE II

| Run number | Membrane thickness (dry) [μm] | UFL·$10^3$ (dry) [ml/min · kp] | $Dl_{B12}·10^3$ (dry membrane) [cm/min] |
|---|---|---|---|
| 7 a | 23 | 16.9 | 6.3 |
| 10 a | 19 | 26.0 | 6.5 |
| 11 a | 21 | 39.7 | 6.9 |
| 13 a | 20 | 61.9 | 8.1 |
| 14 a | 21 | 22.9 | 5.9 | a = dried without aftertreatment

TABLE III

| Run number | Membrane thickness (dry) [μm] | UFL.$10^3$ (dry) [ml/min · kp] | $DL_{B12}·10^3$ (dry membrane) [cm/min] |
|---|---|---|---|
| 5 b | 24 | 7.2 | 5.6 |
| 10 b | 20 | 71.1 | 13.0 |
| 15 b | 18 | 12.1 | 8.7 |
| 15 c | 19 | 19.9 | 11.7 | b = aftertreatment with glycerol/water/ethanol in a ratio of 35%:10%:55% at a bath temperature of 25° C. before drying. Drying temperature 60° C.
c = aftertreatment with glycerol/water/ethanol in a ratio of 41%:9%:50% at a bath temperature of 25° C. before drying. Drying temperature 50° C.

What is claimed is:

1. An isotropic polycarbonate-polyether block copolymer membrane useful for hemodialysis, containing less than 0.5 weight percent impurities consisting essentially of
  (1) about 5 to 35 weight percent of repeating polyethylene-ether-carbonate units, the polyethylene oxide blocks of said copolymer having a molecular weight of from 1000 to 20,000, and
  (2) about 95 to 65 weight percent of repeating bisphenol A - carbonate units wherein the intrinsic viscosity of said copolymer ranges from about 180 to 300 ml/g as measured in chloroform at 25° C., and
  the ultrafiltration rate of said membrane amounts to about 4 to 200 ml/h.m²mmHg, said membrane being prepared by a wet extrusion process.

2. The membrane according to claim 1 formed as a flat foil.

3. The membrane according to claim 1 formed as a tubular foil.

4. The membrane according to claim 1 formed as a hollow fiber.

5. The membrane according to claim 1 wherein numerically the dialytical permeability $DL_{B12}$ for vitamine B 12 (as measured at 20° C.) depends on the ultrafiltration efficiency UFL according to the formula $$DL_{B12} = (\text{about } 2.25 \text{ to } 2.75) \cdot \sqrt{UFL}.$$

6. The membrane according to claim 1 wherein the polycarbonate-polyether-copolymer comprises from about 7 to 13 weight percent of repeating polyethyleneoxide-carbonate units, wherein the average molecular weight of the polyethyleneoxide-carbonate blocks is from about 6,000 to 10,000, and from about 93 to 87 weight percent of repeating bisphenol A-carbonate units.

7. An isotropic polycarbonate-polyether block copolymer membrane useful for hemodialysis, containing less than 0.5 weight percent impurities consisting essentially of
  (1) about 5 to 35 weight percent of repeating polyethylene-ether-carbonate units, the polyethylene oxide blocks of said copolymer having a molecular weight of from 1000 to 20,000, and
  (2) about 95 to 65 weight percent of repeating bisphenol A - carbonate units wherein the intrinsic viscosity of said copolymer ranges from about 180 to 300 ml/g as measured in chloroform at 25° C., and
  The ultrafiltration rate of said membrane amounts to about 4 to 200 ml/h.m² mmHg, said membrane being prepared by a wet extrusion process comprising the following steps:
  (a) dissolving said polycarbonate - polyether block copolymer in a solvent therefor at a temperature of from about 80°-120° C.,
  (b) increasing the temperature of said solution to about 140°-180° C.,
  (c) filtering said solution,
  (d) cooling said filtered solution to about 20°-50° C.,
  (e) extruding said solution through a nozzle into a bath containing a non-solvent for the copolymer for precipitating the polymer, and
  (f) drying the extruded precipitated polymer in the presence of measures for preventing longitudinal and cross-sectional shrinkage.

8. The membrane according to claim 7 in the form of a flat foil.

9. The membrane according to claim 7 in the form of a tube.

10. The membrane according to claim 7 in the form of a hollow fiber.

11. The membrane according to claim 7 wherein numerically the dialytical permeability $DL_{B12}$ for Vitamin B 12 (measured at 20° C.) depends on the ultrafiltration efficiency UFL according to the formula $$DL_{B12} = (\text{about } 2.25 \text{ to } 2.75) \cdot \sqrt{UFL}.$$

12. The membrane according to claim 7 wherein said polycarbonate-polyether copolymer consists assentially of (1) about 7 to 13 weight percent of repeating polyethylene oxide-carbonate units, wherein the average molecular weight of the polyethylene oxide-carbonate blocks is from about 6,000 to 10,000, and (2) about 93 to 87 weight percent of repeating bisphenol A-carbonate units.

* * * * *